United States Patent
Williams

(10) Patent No.: US 10,563,628 B2
(45) Date of Patent: Feb. 18, 2020

(54) SUPER-PLEATED VEHICLE AIR FILTER

(71) Applicant: K&N Engineering, Inc., Riverside, CA (US)

(72) Inventor: Steve Williams, Beaumont, CA (US)

(73) Assignee: K&N Engineering, Inc.

( * ) Notice: Subject to any disclaimer, the term of this patent is extended or adjusted under 35 U.S.C. 154(b) by 135 days.

(21) Appl. No.: 15/453,353

(22) Filed: Mar. 8, 2017

(65) Prior Publication Data

US 2017/0260936 A1 Sep. 14, 2017

Related U.S. Application Data

(60) Provisional application No. 62/305,432, filed on Mar. 8, 2016.

(51) Int. Cl.
| | | |
|---|---|---|
| *B01D 53/22* | (2006.01) | |
| *F02M 35/024* | (2006.01) | |
| *B01D 46/52* | (2006.01) | |
| *B01D 46/00* | (2006.01) | |
| *B01D 46/24* | (2006.01) | |

(52) U.S. Cl.
CPC ..... *F02M 35/0245* (2013.01); *B01D 46/0005* (2013.01); *B01D 46/2411* (2013.01); *B01D 46/521* (2013.01); *F02M 35/02416* (2013.01); *F02M 35/02458* (2013.01); *B01D 2279/60* (2013.01)

(58) Field of Classification Search
CPC ......... F02M 35/02416; F02M 35/0245; F02M 35/02458; B01D 46/521; B01D 46/0005; B01D 2279/60
See application file for complete search history.

(56) References Cited

U.S. PATENT DOCUMENTS

| | | | | |
|---|---|---|---|---|
| 2,487,115 A | * | 11/1949 | Dyke | F02M 35/022 |
| | | | | 181/231 |
| 3,413,782 A | | 12/1968 | Bartlett | |
| 3,417,551 A | | 12/1968 | Bonell | |
| 4,259,096 A | | 3/1981 | Nakamura et al. | |
| 4,300,928 A | * | 11/1981 | Sugie | B01D 46/24 |
| | | | | 181/207 |

(Continued)

OTHER PUBLICATIONS

International Search Report from Patent Application No. PCT/US2017/021406 dated May 25, 2017.

*Primary Examiner* — Anthony R Shumate
(74) *Attorney, Agent, or Firm* — Rutan & Tucker LLP; Hani Z. Sayed

(57) ABSTRACT

An apparatus and method are provided for an air filter configured to be mounted onto an air inlet of an internal combustion engine. The air filter comprises a first end cap configured to couple with a base which is configured to support a conventional air filter and provide an interface between the conventional air filter and the air inlet. A filter medium which is relatively thicker than the conventional air filter is configured to remove particulate matter and other contaminates from an incoming airstream. A second end cap is configured to couple with a cover which is configured to fasten the conventional air filter and the base onto the air inlet, such that the incoming airstream is directed through the filter medium. The air filter is configured to be installed in place of the conventional air filter without necessitating alteration of the base and cover.

15 Claims, 2 Drawing Sheets

(56) References Cited

U.S. PATENT DOCUMENTS

| | | | |
|---|---|---|---|
| 5,238,474 A | 8/1993 | Kahlbaugh et al. | |
| 6,387,143 B1 * | 5/2002 | Adiletta | B01D 46/10 55/497 |
| 9,790,901 B1 * | 10/2017 | Dredge | F02M 35/086 |
| 2003/0211823 A1 | 11/2003 | Wolf et al. | |
| 2006/0112906 A1 * | 6/2006 | Cunningham | F02M 25/00 123/1 A |
| 2011/0308210 A1 * | 12/2011 | Crabtree | B01D 46/0005 55/483 |
| 2012/0186208 A1 * | 7/2012 | Jen | B01D 46/0005 55/502 |
| 2012/0291406 A1 * | 11/2012 | Crabtree | B01D 46/0005 55/350.1 |
| 2017/0260937 A1 * | 9/2017 | Williams | F02M 35/02416 |

\* cited by examiner

SUPER-PLEATED VEHICLE AIR FILTER

CROSS-REFERENCE TO RELATED APPLICATIONS

This application claims the benefit of priority of U.S. Provisional Application No. 62/305,432, filed Mar. 8, 2016.

FIELD

The field of the present disclosure generally relates to filtration devices. More particularly, the field of the invention relates to an apparatus and a method for an air filter configured to be mounted onto an air inlet of an internal combustion engine.

BACKGROUND

An air filter designed to remove particulate matter from an airstream generally is a device comprising fibrous materials. These fibrous materials may remove solid particulates such as dust, pollen, mold, and bacteria from the airstream. Air filters are used in applications where air quality is important, notably in building ventilation systems and with engines.

Air filters may be used in automobiles, trucks, tractors, locomotives and other vehicles that use internal combustion engines. Air filters may be used with gasoline engines, diesel engines, or other engines that utilize fossil fuels or other combustible substances. Air filters may be used with engines in which combustion is intermittent, such as four-stroke and two-stroke piston engines, as well as other types of engines that take in air continuously so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally the air filters used with internal combustion engines and compressors tend to be comprised of either: paper, foam, or cotton filters. Some filters use an oil bath. Air filters for internal combustion engines prevent abrasive particulate matter from entering the engine's cylinders, where it would cause mechanical wear and oil contamination. In many fuel injected engines, a flat panel pleated paper filter element may be used. This filter is usually placed inside a plastic box connected to the throttle body with ductwork. Vehicles that use carburetors or throttle body fuel injection typically use a cylindrical air filter positioned above the carburetor or throttle body.

Air filters may also be used to filter cabin air, for example, air within a vehicle such as a car, truck, airplane, bus, train, tractor, etc. These air filters may typically be a pleated-paper filter in which outside-air is passed through the filters before entering the vehicle's passenger compartment. Some of these filters are rectangular and similar in shape to the combustion air filter.

BRIEF DESCRIPTION OF THE DRAWINGS

The drawings refer to embodiments of the present disclosure in which.

Figure 1:
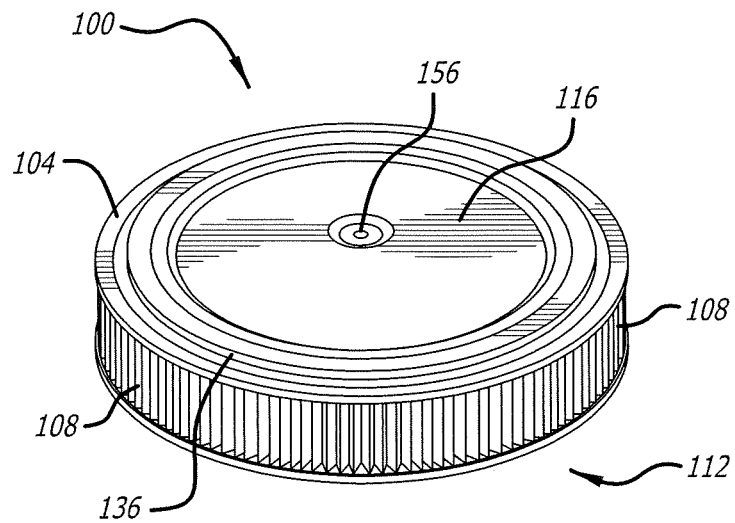
FIG. 1 is a perspective view illustrating an exemplary embodiment of a filtration system comprising an air filter in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first filter," may be made. However, the specific numeric reference should not be interpreted as a literal sequential order but rather interpreted that the "first filter" is different than a "second filter." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In one embodiment, an air filter configured to be mounted onto an air inlet of an internal combustion engine is disclosed, comprising: a first end cap configured to couple with a base which is configured to support a conventional air filter and provide an interface between the conventional air filter and the air inlet, the base comprising an inlet receiver configured to receive the air inlet; a filter medium of the air filter configured to remove particulate matter and other contaminates from an incoming airstream; and a second end cap configured to couple with a cover which is configured to fasten the conventional air filter and the base onto the air inlet such that the incoming airstream is directed through the filter medium.

In another embodiment, the air filter is configured to be installed in place of the conventional air filter without necessitating alteration of the base and cover. In yet another embodiment, the filter medium is relatively thicker than a filter medium of the conventional air filter.

In one embodiment, a wire support is incorporated into the filter medium and configured so as to provide strength and durability to the filter medium. In another embodiment, the filter medium is retained between the first and second end caps.

In one embodiment, the first end cap comprises a recess which is configured to receive a peripheral edge of the base so as to facilitate coupling the air filter with the base. In another embodiment, the second end cap comprises a recess which is configured to receive a peripheral edge of the cover so as to facilitate coupling the air filter with the cover. In yet another embodiment, the first and second end caps are comprised of a deformable material sufficiently strong to support the filter medium.

In one embodiment, the filter medium is comprised of paper, foam, cotton, spun fiberglass, or other known filter materials, woven or non-woven material, synthetic or natural, or any combination thereof. In another embodiment, the filter medium is pleated or otherwise shaped or contoured to increase the surface area for passing the airstream to be cleaned. In yet another embodiment, the filter medium comprises oil to enhance air cleaning properties of the filter medium.

In general, the present disclosure describes an apparatus and a method for an air filter configured to be mounted onto an air inlet of an internal combustion engine. The air filter comprises a first end cap configured to couple with a base which is configured to support a conventional air filter and provide an interface between the conventional air filter and the air inlet. A filter medium which is relatively thicker than the conventional air filter is configured to remove particulate matter and other contaminates from an incoming airstream. The filter medium may be comprised of paper, foam, cotton, spun fiberglass, or other known filter materials, woven or non-woven material, synthetic or natural, or any combination thereof. In some embodiments, the filter medium is pleated or otherwise shaped or contoured to increase the surface area for passing the airstream to be cleaned. Preferably, the filter medium comprises oil to enhance air cleaning properties of the filter medium. A second end cap is configured to couple with a cover which is configured to fasten the conventional air filter and the base onto the air inlet, such that the incoming airstream is directed through the filter medium. In some embodiments, a wire support is incorporated into the filter medium and configured so as to provide strength and durability to the filter medium. The air filter is configured to be installed in place of the conventional air filter without necessitating alteration of the base and cover.

Although embodiments of the invention may be described and illustrated herein in terms of a cylindrical air filter, it should be understood that embodiments of this invention are not limited to the exact shape illustrated, but rather may include a wide variety of generally cylindrical shapes, generally circular, oval, round, curved, conical, or other closed perimeter shape, that provide a relatively large surface area in a given volume of the filter. Moreover, embodiments as described herein are not limited to use as internal combustion engine filters, but may have applicability in other filtration systems in which a large volume of air needs to be treated.

Figure 2:
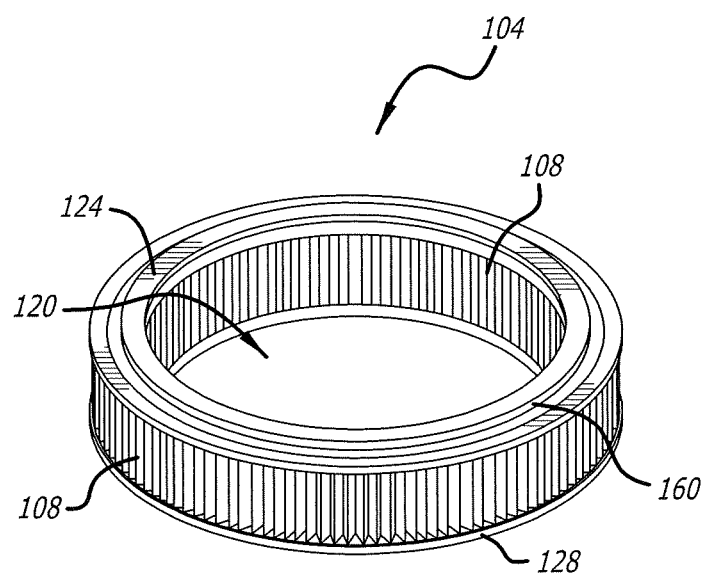
FIG. 2 is a perspective view illustrating an exemplary embodiment of an air filter according to the present disclosure.

FIG. 1 illustrates an exemplary embodiment of a filtration system 100 comprising an air filter 104, according to the present disclosure. The filtration system 100 is configured to be mounted onto an air inlet of an internal combustion engine. In the embodiment illustrated in FIG. 1, the air filter 104 comprises a filter medium 108 retained between a base 112 and a cover 116. The base 112 and cover 116 preferably are comprised of materials that are sufficiently durable and temperature resistant so as to retain their configuration during installation and operation when coupled with the air inlet of the engine. As best illustrated in FIG. 2, wherein the base 112 and cover 116 are removed from the air filter 104, the filter medium 108 circumferentially surrounds an interior cavity 120 such that the filter medium 108 creates an exterior perimeter of at least a portion of the cavity. An exterior cross-sectional shape of the air filter 104 may be generally circular, oval, or otherwise shaped so as to increase the surface area available for air flow passage for a given volume. The shape may be consistent along a longitudinal length, or may vary along the longitudinal length. In some exemplary embodiments, the outer profile may taper along the longitudinal length, from one end to the other end.

The filter medium 108 provides an area to pass an airstream and entrap particulates and other contaminates flowing with the airstream. The filter medium 108 may be comprised of paper, foam, cotton, spun fiberglass, or other known filter materials, woven or non-woven material, synthetic or natural, or any combination thereof. The filter medium 108 may be pleated, or otherwise shaped, or contoured so as to increase a surface area for passing the airstream to be cleaned. The length of the filter medium 108 in the circumferential direction may be longer than the circular circumference of the air filter 104 generally, such that the surface area of the filter medium 108 is greater than the profile surface area of the air filter 104.

The base 112 generally is configured to support the air filter 104 and provide an interface between the air filter 104 and the air inlet of the engine. The base 112 comprises an inlet receiver (not shown) which is configured to receive the air inlet of the engine. The cover 116 is configured to secure the filter medium 108 and the base 112 to the air inlet of the engine, such that air is drawn through the filter medium 108 into the interior cavity 120 of the air filter 104 and then is conducted through the inlet receiver into the air inlet of the engine. As mentioned, the inlet receiver of the base 112 has a configuration suitable to accept the air inlet of the engine. For example, the inlet receiver may comprise any of a variety of ridges, or raised portions so as to optimally engage the air inlet of the engine. Further, it is envisioned that the inlet receiver may be tightened onto the air inlet by way of any of various suitable mechanical fasteners. It should be understood that the specific configuration of the inlet receiver depends upon the particular make and model of the engine for which the air filter 104 is to be utilized, and thus a wide variety of configurations may be incorporated into the air filter 104 and the base 112 without straying beyond the scope of the present disclosure.

As best illustrated in FIG. 2, the air filter 104 comprises the filter medium 108 retained between end caps 124 and 128. The end caps 124, 128 may be either rubber or plastic or other deformable material sufficiently strong to support the filter medium 108. For example, one or both of the end caps 124, 128 may be molded urethane, foam urethane, or a polyurethane elastomer, and/or may comprise a steel, or aluminum infrastructure. In the exemplary embodiment shown, an elastomer molded polyurethane is used to provide an additional hardness and robust exterior seat for the filter medium 108. For reusable filters, the molded elastomer is preferable over foam so as to reduce degradation during cleaning of the air filter.

In some embodiments, a wire support may be incorporated into the filter medium 108 so as to provide additional strength and durability to the air filter 104. As such, the wire support preferably is retained by the end caps 124 and 128 along with the filter medium 108. It will be appreciated that the filter medium 108 and the wire support may be affixed to the end caps 124, 128 by way of any of a variety of fasteners (not shown). In some embodiments, the end caps 124, 128 may be molded to the wire support of the filter medium 108. In some embodiments, a portion of each of the end caps 124, 128 may be crimped around its peripheral edge such that it folds onto and retains the wire support and the filter medium 108 of the air filter 104. Any of a variety of fastening means may be practiced for attaching the filter medium 108 and the wire support to the end caps 124, 128 without deviating from the spirit and scope of the present disclosure.

Figure 3:
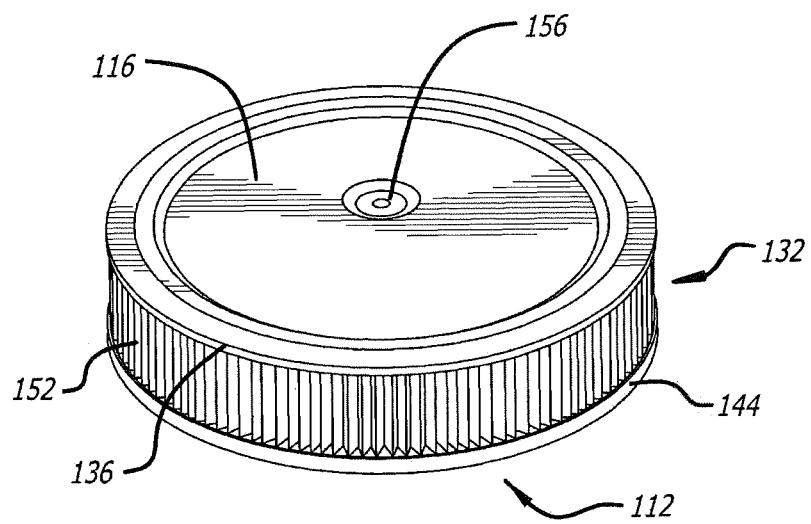
FIG. 3 is a perspective view illustrating a conventional air filter retained between a base and a cover.
Figure 4:
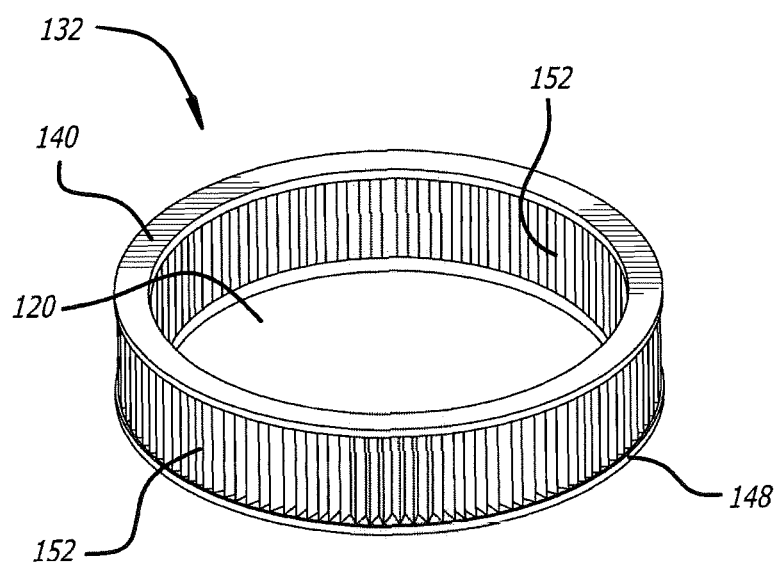
FIG. 4 is a perspective view illustrating the conventional air filter illustrated in FIG. 3 in absence of the base and the cover.

FIG. 3 is a perspective view illustrating the base 112 and the cover 116 installed onto a conventional air filter 132. FIG. 4 is a perspective view illustrating the conventional air filter 132 in absence of the base 112 and the cover 116. As best shown in FIG. 3, the cover 116 comprises a peripheral edge 136 configured to retain an end cap 140 of the conventional air filter 132. Similarly, the base 112 comprises a peripheral edge 144 configured to retain an end cap 148 of the conventional air filter 132. It will be appreciated that the peripheral edges 136, 144 serve to retain the conventional air filter 132 between the cover 116 and the base 112, such that the airstream is drawn through a filter medium 152 when the filter 132 is installed onto the air inlet of the engine. A fastener 156 serves to keep the conventional air filter 132 between the cover 116 and base 112, and thus installed onto the air inlet of the engine. In the illustrated embodiment, the fastener 156 is simply a hole disposed in the center of the cover 116 so as to allow passage of a threaded stud extending upward from the air inlet through an interior cavity of the air filter 132. As will be recognized, a suitably sized nut may be tightened onto the threaded stud so as to install the conventional air filter 132 onto the air inlet of the engine.

Upon comparing the conventional air filter 132, illustrated in FIG. 3, with the air filter 104, illustrated in FIG. 1, it will be observed that the end caps 124, 128 respectively extend beyond the peripheral edges 136, 144. As best shown in FIG. 2, the end cap 124 comprises a recess 160 which is configured to receive the peripheral edge 136. Although not shown, the end cap 128 comprises a recess which is substantially similar to the recess 160 and is configured to receive the peripheral edge 144. As will be appreciated, filter medium 108 is relatively thicker than the filter medium 152 of the conventional air filter 132, and correspondingly the ends caps 124, 128 are relatively wider in a radial direction than the end caps 140, 148 of the conventional air filter 132. Accordingly, although the base 112 and cover 116 are sized to accommodate the conventional air filter 132, the recesses 160 in the end caps 124, 128 advantageously facilitate coupling the relatively thicker air filter 104 with the base 112 and cover 116. It should be understood, therefore, that the air filter 104 of the present disclosure may be installed in place of the conventional air filter 132 without any need for alteration of the base 112 and cover 116.

It is envisioned that a user of the air filter 104 may periodically clean the filter medium 108 rather than replacing the air filter 104, as is typically done with conventional air filters. In some embodiments, a method for cleaning the filter medium 108 comprises removing the cover 116 from the filtration system 100, removing the air filter 104 from the base 112, inserting a water hose into the interior cavity 120 of the filter, and spraying water so as to flush contaminants from the filter medium 108. In some embodiments, the method for cleaning the air filter 104 comprises utilizing a high pressure air hose in lieu of the water hose. In some embodiments, the method for cleaning the air filter 104 comprises spraying water onto the exterior of the filter medium 108, such that the water and contaminants drain from the exterior of the filter medium 108. Other cleaning methods will be apparent to those skilled in the art without deviating from the spirit and scope of the present disclosure.

As discussed above, a wire support may be coupled with the filter medium 108 so as to provide additional strength and durability to the air filter 104. The wire support facilitates periodic cleaning and reusing the air filter 104 instead of discarding the filter after each application. In some embodiments, the filter medium 108 may be positioned between the wire support and one or more layers of a reinforcing material. For example, the wire support may comprise a wire screen positioned on an outer surface and an inner surface of the filter medium 108. In some embodiments, the wire screens may be comprised of powder-coated aluminum screen wire that is co-pleated along with the filter medium 108 so as to reinforce the air filter 104. In some embodiments, the inner surface of the filter medium 108 may comprise a stronger mesh reinforcement which is similar to those incorporated into Diesel filter applications. In some embodiments, additional or alternative reinforcements may be provided, as will be apparent to those skilled in the art.

In the embodiment of the air filter 104 illustrated in FIGS. 1 and 2, the base 112 has a diameter substantially equal to the diameter of the cover 116. In some embodiments, however, the base 112 may have a larger size than the size of the cover 116. It should be understood that the air filter 104 of the present disclosure is not limited to the exact shape illustrated in FIGS. 1 and 2, but rather may include a wide variety of generally cylindrical shapes, generally circular, oval, round, curved, or other closed perimeter shapes, that provide a relatively large surface area of the filter medium 108. In some embodiments, the filter medium 108 may comprise various heights other than as shown in FIGS. 1 and 2, as well as comprising various cone-shapes.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The invention claimed is:

1. An air filter configured to be mounted onto an air inlet of an internal combustion engine, comprising:
   a filter medium configured to remove particulate matter and other contaminates from an incoming airstream;
   a base comprising an inlet receiver, wherein the inlet receiver is configured to receive the air inlet, and wherein the base is configured to support the filter medium, and provide an interface between the air filter and the air inlet;
   a cover that is configured (i) to fasten the air filter onto the air inlet via a fastener disposed in the cover, and (ii) direct the incoming airstream through the filter medium;
   a first end cap comprising a first recess configured to receive a peripheral edge of the base thereby coupling the first end cap with the base, wherein the first end cap extends beyond the peripheral edge of the base; and
   a second end cap comprising a second recess configured to receive a peripheral edge of the cover thereby coupling the second end cap with the cover.

2. The air filter of claim 1, wherein the fastener disposed in the cover includes a hole disposed in the cover and a threaded stud to extend through an interior cavity of the air filter.

3. The air filter of claim 1, wherein a wire support is incorporated into the filter medium and configured reinforce the filter medium.

4. The air filter of claim 1, wherein the filter medium is retained between the first end cap and the second end cap.

5. The air filter of claim 4, wherein the first end cap and the second end cap are each comprised of a deformable material sufficiently strong configured to support the filter medium.

6. The air filter of claim 1, wherein the filter medium is comprised of at least one of paper, foam, cotton, spun fiberglass, or other known filter materials, woven or non-woven material that is either synthetic or natural, or any combination thereof.

7. The air filter of claim 1, wherein the filter medium is pleated.

8. The air filter of claim 1, wherein the filter medium comprises oil, wherein a presence of oil is configured to enhance air cleaning properties of the filter medium.

9. The air filter of claim 5, wherein the deformable material is one of rubber or plastic.

10. The air filter of claim 5, wherein the deformable material is one of molded urethane, foam urethane, or a polyurethane elastomer.

11. The air filter of claim 1, wherein the second end cap extends beyond the peripheral edge of the cover.

12. The air filter of claim 1, wherein a wire support includes a wire screen positioned on an outer surface and an inner surface of the filter medium.

13. An air filter system configured to be mounted onto an air inlet of an internal combustion engine, comprising:
   a filter medium configured to receive an incoming airstream;
   a base comprising an inlet receiver, wherein the inlet receiver is configured to receive the air inlet, and wherein the base is configured to support the filter medium, and provide an interface between the air filter and the air inlet;
   a first end cap comprising a first recess configured to receive a peripheral exterior edge of the base thereby coupling the first end cap with the base, wherein the first end cap extends beyond the peripheral exterior edge of the base.

14. The air filter system of claim 13, further comprising:
   a cover that is configured (i) to fasten the air filter onto the air inlet via a fastener disposed in the cover, and (ii) direct the incoming airstream through the filter medium;
   a second end cap comprising a second recess configured to receive a peripheral edge of the cover thereby coupling the second end cap with the cover.

15. The air filter system of claim 14, wherein the second end cap extends beyond the peripheral edge of the cover.

* * * * *